(12) United States Patent
Clark et al.

(10) Patent No.: US 9,851,431 B2
(45) Date of Patent: Dec. 26, 2017

(54) RADAR

(71) Applicant: BAE SYSTEMS plc, London (GB)

(72) Inventors: Marcus Edward Clark, Isle of Wight (GB); Robert Wills, Isle of Wight (GB)

(73) Assignee: BAE SYSTEMS plc, London (GB)

( * ) Notice: Subject to any disclaimer, the term of this patent is extended or adjusted under 35 U.S.C. 154(b) by 370 days.

(21) Appl. No.: 14/653,104

(22) PCT Filed: Dec. 12, 2013

(86) PCT No.: PCT/GB2013/053262
§ 371 (c)(1),
(2) Date: Jun. 17, 2015

(87) PCT Pub. No.: WO2014/096778
PCT Pub. Date: Jun. 26, 2014

(65) Prior Publication Data
US 2015/0338504 A1    Nov. 26, 2015

(30) Foreign Application Priority Data

Dec. 18, 2012 (EP) ..................................... 12275211
Dec. 18, 2012 (GB) .................................... 1222830.0

(51) Int. Cl.
*G01S 7/02* (2006.01)
*H01Q 3/04* (2006.01)
(Continued)

(52) U.S. Cl.
CPC ............ *G01S 7/023* (2013.01); *G01S 7/2813* (2013.01); *H01Q 3/04* (2013.01)

(58) Field of Classification Search
CPC .... G01S 7/023; G01S 7/2813; G01S 13/5242; G01S 3/20; H01Q 3/04; H01Q 3/00
See application file for complete search history.

(56) References Cited

U.S. PATENT DOCUMENTS 4,104,631 A * 8/1978 Weigle et al. ...... G01S 13/5242
6,469,654 B1    10/2002 Winner et al.
(Continued)

FOREIGN PATENT DOCUMENTS

EP    2390679 A1    11/2011
FR    2634901 A1 *  2/1990 ......... G01S 13/5242
(Continued)

OTHER PUBLICATIONS

International Search Report received for Patent Application No. PCT/GB2013/053262, dated Mar. 5, 2014. 3 pages.
(Continued)

*Primary Examiner* — Bernarr E Gregory
(74) *Attorney, Agent, or Firm* — Finch & Maloney PLLC

(57) ABSTRACT

An antenna system (1) comprises a directional antenna (2) adapted to rotate through a range of directions in azimuth. It is responsive to radio-frequency (RF) signals received from directions within the range of directions in azimuth. A receiver (7) is arranged to receive the RF signals from the antenna within a signal frequency response band of the receiver and to provide a corresponding output for signal processing. A signal filter (11) is operable to block the output from the receiver when the frequency of the RF signal lies at a frequency within the signal frequency response band of the receiver and a detector unit (8) is arranged to apply the signal filter when the directional antenna is directed to a predetermined azimuth at which an interference source is located and to not apply the signal filter otherwise.

20 Claims, 2 Drawing Sheets

(51) Int. Cl.
*G01S 7/28* (2006.01)
*G01S 13/00* (2006.01)
*H01Q 3/00* (2006.01)

(56) References Cited

U.S. PATENT DOCUMENTS

| | | |
|---|---|---|
| 6,825,804 B1 * | 11/2004 | Doty .................. G01S 3/20 |
| 2008/0036645 A1 | 2/2008 | Yamano et al. |
| 2010/0019950 A1 | 1/2010 | Yamano et al. |
| 2010/0136926 A1 | 6/2010 | Lackey |
| 2011/0298651 A1 | 12/2011 | Nakagawa et al. |
| 2012/0139786 A1 | 6/2012 | Puzella et al. |

FOREIGN PATENT DOCUMENTS

| | | | | |
|---|---|---|---|---|
| FR | 2757290 A1 * | 6/1998 | ............... | H01Q 3/00 |
| GB | 2270437 A | 3/1994 | | |
| JP | H1183983 A | 3/1999 | | |
| WO | 2014096778 A1 | 6/2014 | | |

OTHER PUBLICATIONS

GB Intellectual Property Office Search Report under Section 17(5) received for GB Patent Application No. 1222830.0, dated Jun. 3, 2013. 4 pages.
Extended European Search Report received for EP Patent Application No. 12275211.6, dated May 27, 2013. 5 pages.
International Preliminary Report on Patentability and Written Opinion received for Patent Application No. PCT/GB2013/053262, dated Jul. 2, 2015. 7 pages.

* cited by examiner

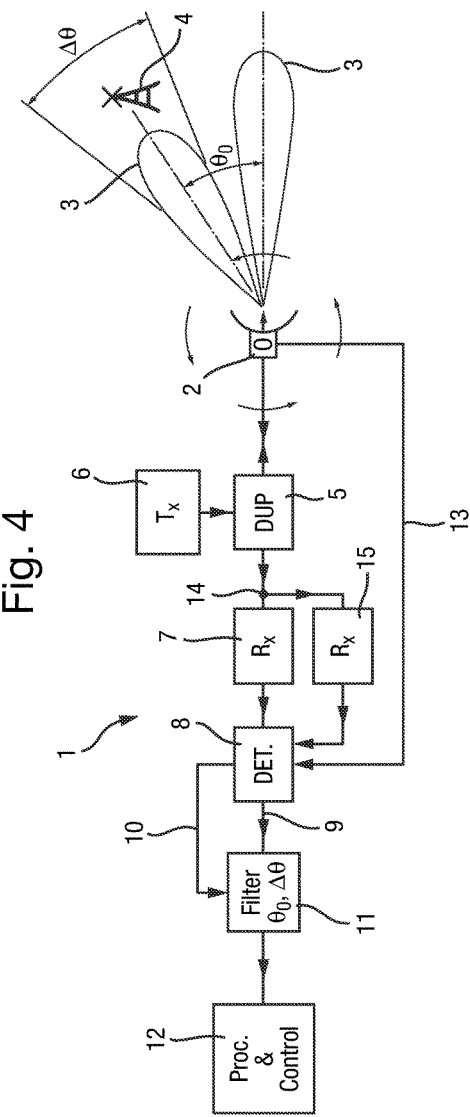

RADAR

FIELD OF THE INVENTION

The present invention relates to radar systems employing a directional antenna forming a beam that is e.g. swept through a range of azimuth angles in use.

BACKGROUND

The frequency band for some telecommunications signal frequencies (e.g. "4G") may abut or reside closely with a radar signal frequency (e.g. the "S-Band"—from 2 GHz to 4 GHz). A narrow buffer zone typically exists in the frequency spectrum separating telecommunications signal frequency band from the radar signal frequency band. This aims to avoid interference of telecommunications signals with radar operations. The distribution of such neighbouring bands is shown schematically in FIG. 1.

However, circumstances can arise in which telecommunications signals may appear within, or may migrate to, frequencies falling within the radar band adjacent to it. A spill-over can occur from the spectral content of the telecommunications signal frequency band into the radar band. Radar receivers may pick up interference from the low-level spectral content of a telecoms signal that can extend for up to one quarter of the way into a radar band. These interfere with radar operations and are detrimental to safety, especially with respect to airport radar systems etc.

The invention aims to address this.

SUMMARY OF THE INVENTION

In order to mitigate against any telecommunications (e.g. 4G) signals migrating into the operational radar signal frequency band (e.g. S-band), the invention at its most general is to apply selectively an azimuth dependent filter to a region of the signal frequency band (e.g. S-band) of the radar antenna adjacent to the telecommunications signal frequency band (e.g. a 4G band) to effectively widen the buffer zone. The invention may include assessing the impact of any interference and determining the action to be taken, which may vary from taking no action, if the impact of interference is acceptable, to taking some action by applying the filter.

For example, the invention may include determining a magnitude a received signal and determining from that magnitude whether the signal will overload the receivers of the radar system.

Upon detection of a telecommunications transmitter at a particular azimuth, a frequency filter may be applied (e.g. periodically) to signals received by the radar receiver whilst at that azimuth, so as to remove signals within the widened buffer zone. Signals at other frequencies within the radar signal frequency band may continue to be received.

In a first aspect, the invention may provide an antenna system comprising: a directional antenna adapted to rotate through a range of directions in azimuth and responsive to radio-frequency (RF) signals received from directions within the range of directions in azimuth; a receiver arranged to receive the RF signals from the antenna within a signal frequency response band of the receiver and to provide a corresponding output for signal processing; a signal filter arranged to block an output from the receiver when the frequency of the RF signal lies at a frequency within the signal frequency response band; a controller arranged to apply the signal filter when the directional antenna is directed to a predetermined azimuth and to not apply the signal filter otherwise.

In this way interfering signals may be blocked at relevant azimuth positions by applying the signal filter when the directional antenna is directed to a predetermined azimuth at which an interference source is located and to not apply the signal filter otherwise.

The antenna system may include a further receiver arranged to receive further RF signals having a frequency outside of, and adjacent to, the signal frequency response band and to provide a corresponding further output for signal processing, wherein the controller is arranged to apply the filter according to the further output. Preferably, the filter is applied if such further RF signals are received, and not applied otherwise.

The controller may be arranged to determine a measure of a degree of signal interference in signals within the signal frequency response band and to apply the filter if the further RF signals are received and the measure exceeds a predetermined threshold. The controller may determine the measure of the degree of signal interference by determining the power of a received signal(s). The predetermined threshold may be a predetermined signal power level threshold value. Preferably, the threshold value is a signal power level value above which, if received by the receiver of the antenna system, will/would overload the receiver (e.g. cause it to operate/respond non-linearly). In this way, the filter may be selectively applied based on this threshold comparison. The further receiver may be arranged to receive the further RF signals from the antenna or from a dedicated further antenna.

The spectrum or characteristic of the filter is preferably arranged to block frequencies residing in only some but not all of the signal frequency response band of the receiver. For example, the spectrum or characteristic of the filter may extend part way in to the signal frequency response band (e.g. covering up to $\frac{1}{8}^{th}$ of the response bandwidth) from/across one end (upper or lower end) of the response band.

The signal filter is preferably a high-pass (or low-pass) filter arranged to block the output from the receiver when the frequency of the RF signal lies below (or above) a threshold frequency defined by the signal filter.

The directional antenna may be arranged to rotate periodically through 360 degrees and the controller is preferably arranged to apply the signal filter periodically. The controller may be arranged to apply the signal filter with a periodicity corresponding to the rotation period of the directional antenna.

The predetermined azimuth is preferably a predetermined range of azimuth angles. For example, the range may be a range corresponding to the angular width of the beam of the antenna, or corresponding to the angular width of any relevant lobe of the radiation pattern of the antenna (e.g. main lobe or a significant side lobe).

In a second aspect, the invention may provide a method for controlling a directional antenna system comprising: rotating a directional antenna through a range of directions in azimuth; receiving RF signals from the antenna at a receiver responsive to radio-frequency (RF) signals within a signal frequency response band therewith to provide a corresponding output for signal processing; selectively blocking an output from the receiver using a signal filter if the frequency of the RF signal lies at a frequency within the signal frequency response band whereby the signal filter is applied if the directional antenna is directed to a predetermined azimuth and is not applied otherwise. The receiving of the RF signals is preferably in respect of signals received from directions within the range of directions in azimuth.

The method may include receiving further RF signals at a further receiver having a frequency outside of, and adjacent to, the signal frequency response band and therewith providing a corresponding further output for signal processing. The method may include applying the filter according to the further output. Preferably, the filter is applied if such further RF signals are received, and not applied otherwise.

The method may include determining a measure of a degree of signal interference in signals within the signal frequency response band and to applying the filter if the further RF signals are received and the measure exceeds a predetermined threshold. The method may include determining the measure of the degree of signal interference by determining the power of a received signal(s). The predetermined threshold may be a predetermined signal power level threshold value. Preferably, the threshold value is a signal power level value above which, if received by the receiver of the antenna system, will/would overload the receiver (e.g. cause it to operate/respond non-linearly).

The further receiver may be arranged to receive the further RF signals from the antenna or from a dedicated further antenna.

The method may include blocking, using the signal filter, frequencies residing in only some but not all of the signal frequency response band of the receiver. For example, the method may include blocking signal frequencies extending part way in to the signal frequency response band (e.g. covering up to $1/8^{th}$ of the response bandwidth) from/across one end (upper or lower end) of the response band.

The method may include rotating the directional antenna periodically through 360 degrees applying the signal filter periodically. The method may include applying the signal filter with a periodicity corresponding to the rotation period of the directional antenna. The predetermined azimuth is preferably a predetermined range of azimuth angles.

The signal filter is preferably a high-pass (or low pass) filter, and the method may include blocking the output from the receiver using the signal filter when the frequency of the RF signal lies below (or above) a threshold frequency defined by the signal filter.

BRIEF DESCRIPTION OF THE DRAWINGS

An exemplary, but non-limiting embodiment of the invention shall now be described with reference to the drawings of which:

FIG. 4 schematically shows a radar apparatus according to an embodiment of the invention.

In the drawings, like items are assigned like reference symbols.

DETAILED DESCRIPTION

Figure 1:
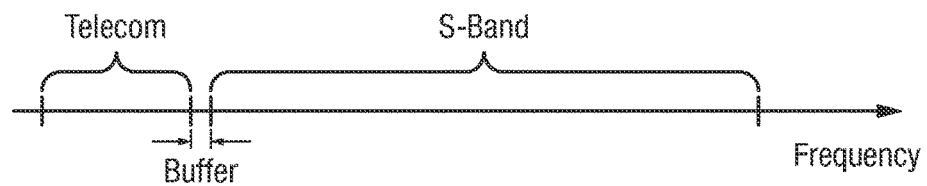
FIG. 1 shows schematically a buffer region separating telecommunications and radar signal frequency bands.

FIG. 4 shows a schematic representation of a radar apparatus (1) comprising a directional antenna (2) arranged to be rotated in azimuth at a desired uniform rate (as shown by arrows). The antenna is arranged to form an antenna main beam (3) having an angular spread of $\Delta\theta$ degrees in azimuth. A telecommunications tower (4) radiates telecommunications signals having frequencies in a telecommunications signal frequency band shown in FIG. 1. The radar apparatus is arranged to receive radar signals with signal frequencies within the S-band shown in FIG. 1.

The radar apparatus has a duplexer unit (5) connected to a transmitter (6) arranged for generating radar signals having frequencies within the S-band, and is connected to a first receiver unit (7) arranged for receiving radar signals having frequencies within the S-band. The duplexer is also connected to a second receiver unit (15) arranged for receiving radar signals having frequencies outside the S-band and within a telecommunications signal frequency band shown in FIG. 1. The RF signal input to the second receiver is obtained from the signal transmission line connecting the output of the duplexer to the first receiver. In particular, a directional coupler (14) is connected to the signal transmission line in question and is arranged to extract a small percentage of the RF signal thereon for input to the second receiver unit. This is for the purposes of detection of the presence of RF signals outside the frequency response band of the first receiver.

A detector unit (8) is arranged to receive the signals output from the second receiver unit (15) and therewith to detect the presence of received RF signals having a frequency lying within a signals having frequencies in the telecommunications signal frequency band shown in FIG. 1. Concurrently, the detector unit is arranged to receive the signals output from the first receiver unit (7) and therewith to determine a measure of interference within RF signals within the signal frequency response band. The measure of the degree of signal interference is determined by measuring the power of the received signal from the first receiver unit.

The predetermined threshold is a predetermined signal power level threshold value above which, if received by the receiver (7) of the antenna system, will overload the receiver and cause it to operate/respond non-linearly to received RF signals—i.e. whereby the receiver output is not in direct/linear proportion to the received RF signal input power. The detector unit compares the measure of interference (signal power) with a predetermined threshold value (overload power level) and if the threshold is exceeded, the detector unit deems the interference levels to be unacceptable and generates a filter control signal.

The detector unit has a first output (9) upon which it outputs the input RF signal it received from the receiver unit (7) unchanged, and a second output (10) which is the filter control signal, both for input to a high-pass filter unit (11). The filter unit is responsive to the filter control signal to apply a frequency high-pass signal blocking filter to the receiver output signal (9) received by the filter unit (11), and to not apply the filter when the filter control signal is otherwise absent.

The filter unit is arranged to apply the frequency filter during an azimuth range of width $\Delta\theta$ corresponding to the beam width of the antenna beam, centred on a frequency $\theta_0$ corresponding to the azimuth of the directional antenna (2) when the antenna beam (3) is centred upon the detected azimuth of the interfering telecommunications signals—namely, the telecommunications tower (4). An azimuth signal (13) is transmitted continuously from the azimuth control parts of the directional antenna to the detector unit and the detector unit is arranged to determine/correlate the azimuth angles occupied by the antenna when the detector unit detects telecommunications signals via the second receiver unit (15).

Figure 3:
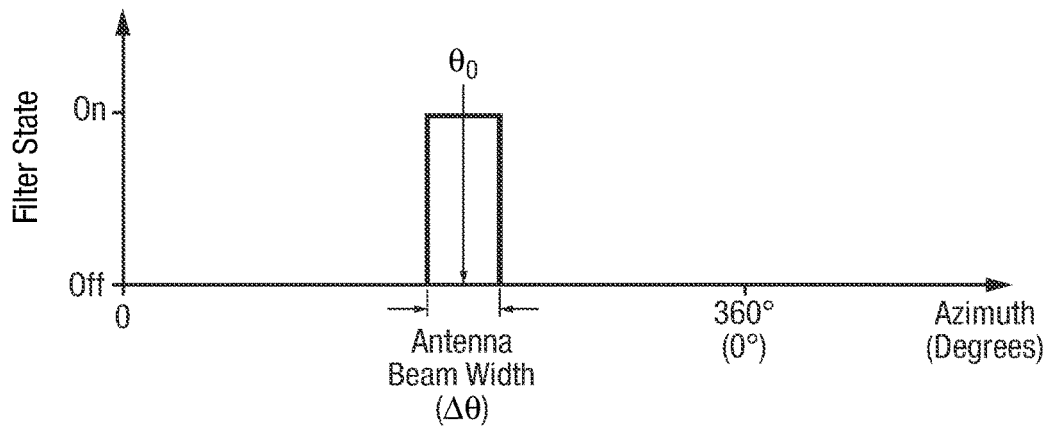
FIG. 3 graphically shows the azimuthal dependence of the filter state in use according to an embodiment of the invention.

FIG. 3 graphically shows the state of the filter unit, in response to filter control signals (10), as a function of azimuth angle, indicating the detected azimuth of the telecommunications tower and the antenna beam width. The filter is controlled to be selectively applied during antenna azimuth angles in the range $\Delta\theta$ centred upon azimuth $\theta_0$.

Figure 2:
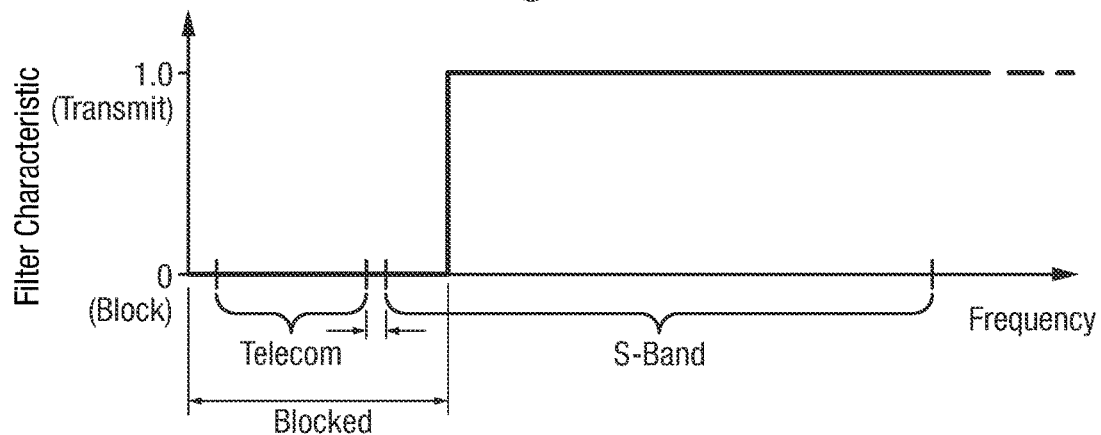
FIG. 2 graphically shows the spectral characteristic of a filter according to an embodiment of the invention.

FIG. 2 illustrates the spectral characteristic of the filter whereby a value 1.0 denotes full transmission and a value of 0.0 denotes no transmission (i.e. signal blocked). The filter is a high-pass filter which blocks the telecommunications band, and a lower part of the S-band. It can be seen that the narrow buffer zone separating the telecommunications signal frequency band from the radar S-band, is extended into the S-band. This extent may be an amount up to about $\frac{1}{8}^{th}$ of the width of the S-band. Any further extension is likely to be detrimental to radar operations. It has been found that this extension is sufficient to amply remove the detrimental effects of interference from a neighbouring telecommunications band (e.g. 4G), but lesser extensions are also possible.

The embodiments described above are presented for illustrative purposes and it is to be understood that variations, modifications and equivalents thereto such as would be readily apparent to the skilled person are encompassed within the scope of the invention.

The invention claimed is:

1. An antenna system comprising:
a directional antenna adapted to rotate through a range of directions in azimuth and responsive to radio-frequency (RF) signals received from directions within said range of directions in azimuth;
a receiver arranged to receive said RF signals from the antenna within a signal frequency response band of the receiver and to provide a corresponding output for signal processing;
a signal filter operable to block a said output from the receiver when the frequency of the RF signal lies at a frequency within the signal frequency response band; and
a controller arranged to apply said signal filter when the directional antenna is directed to a predetermined azimuth and to not apply the signal filter otherwise.

2. An antenna according to claim 1 in which the directional antenna is arranged to rotate periodically through 360 degrees and the controller is arranged to apply said signal filter periodically.

3. An antenna according to claim 2 in which with the controller is arranged to apply said signal filter with a periodicity corresponding to the rotation period of said directional antenna.

4. An antenna according to claim 1 in which said predetermined azimuth is a predetermined range of azimuth angles.

5. An antenna according to claim 1 in which said signal filter is a high-pass filter arranged to block said output from the receiver when the frequency of said RF signal lies below a threshold frequency defined by the signal filter.

6. An antenna according to claim 1 in which with the controller is arranged to apply said signal filter with a periodicity corresponding to a rotation period of said directional antenna.

7. An antenna according to claim 6 in which said predetermined azimuth is a predetermined range of azimuth angles.

8. An antenna according to claim 6 in which said signal filter is a high-pass filter arranged to block said output from the receiver when the frequency of said RF signal lies below a threshold frequency defined by the signal filter.

9. A method for controlling a directional antenna system, the method comprising:
rotating a directional antenna through a range of directions in azimuth, the antenna responsive to radio-frequency (RF) signals received from directions within said range of directions in azimuth;
receiving said RF signals from the antenna at a receiver responsive to radio-frequency (RF) signals within a signal frequency response band to provide a corresponding output for signal processing; and
selectively blocking a said output from the receiver using a signal filter if the frequency of said RF signal lies at a frequency within said signal frequency response band;
whereby the signal filter is applied if the directional antenna is directed to a predetermined azimuth and is not applied otherwise.

10. A method according to claim 9 including rotating the directional antenna periodically through 360 degrees applying said signal filter periodically.

11. A method according to claim 10 including applying said signal filter with a periodicity corresponding to the rotation period of said directional antenna.

12. A method according to claim 11 in which said signal filter is a high-pass filter, and therewith blocking said output from the receiver when the frequency of said RF signal lies below a threshold frequency defined by the signal filter.

13. A method according to claim 10 in which said predetermined azimuth is a predetermined range of azimuth angles.

14. A method according to claim 13 in which said signal filter is a high-pass filter, and therewith blocking said output from the receiver when the frequency of said RF signal lies below a threshold frequency defined by the signal filter.

15. A method according to claim 10 in which said signal filter is a high-pass filter, and therewith blocking said output from the receiver when the frequency of said RF signal lies below a threshold frequency defined by the signal filter.

16. A method according to claim 9 in which said signal filter is a high-pass filter, and therewith blocking said output from the receiver when the frequency of said RF signal lies below a threshold frequency defined by the signal filter.

17. A method according to claim 9 including applying said signal filter with a periodicity corresponding to a rotation period of said directional antenna.

18. A method according to claim 17 in which said signal filter is a high-pass filter, and therewith blocking said output from the receiver when the frequency of said RF signal lies below a threshold frequency defined by the signal filter.

19. A method according to claim 9 in which said predetermined azimuth is a predetermined range of azimuth angles.

20. A method according to claim 9 in which said signal filter is a high-pass filter, and therewith blocking said output from the receiver when the frequency of said RF signal lies below a threshold frequency defined by the signal filter.

* * * * *